Dec. 24, 1946.   D. M. EBERT ET AL   2,413,102
DEGASSIFIER
Filed Nov. 25, 1941
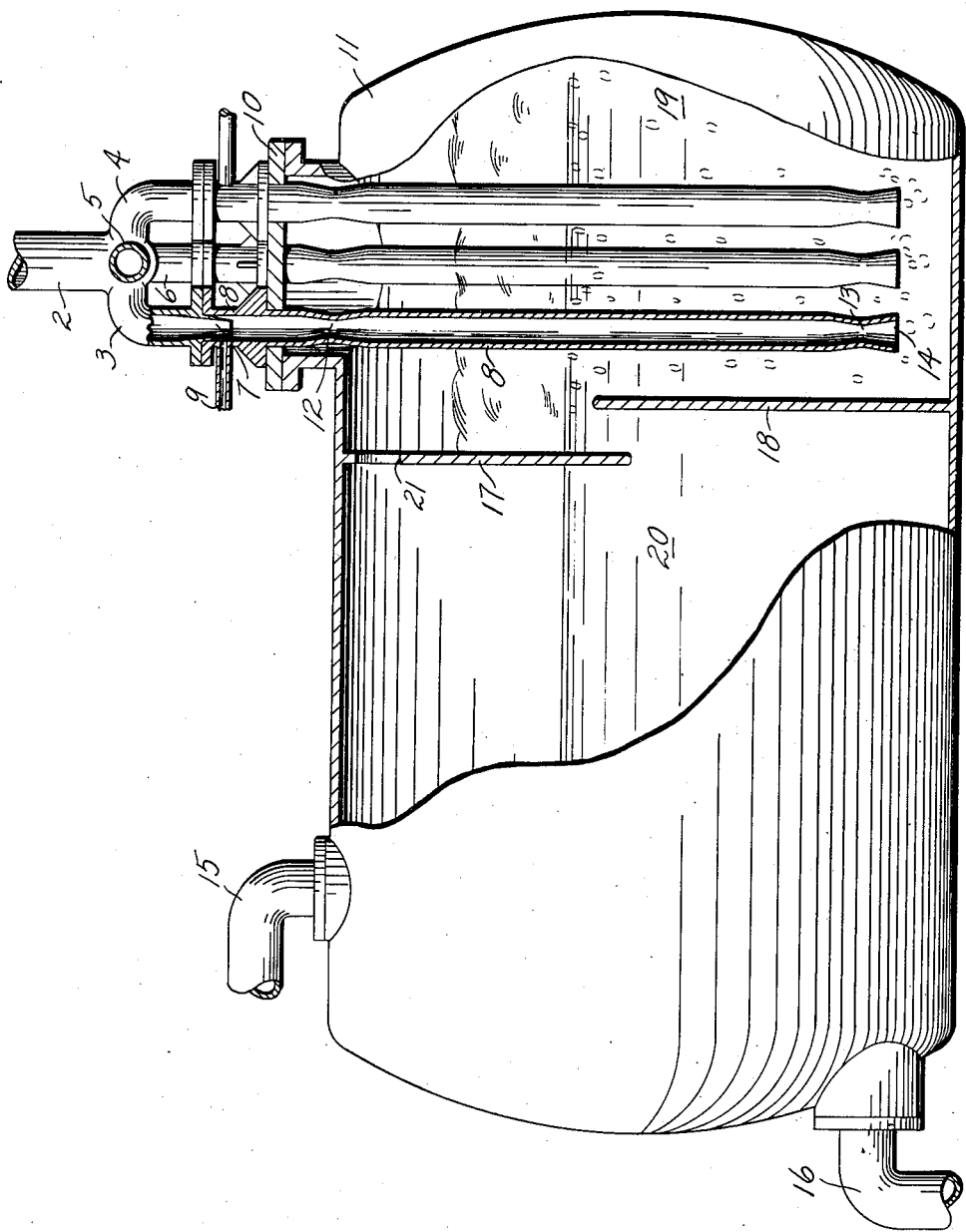
INVENTOR.
DAVID MATHIAS EBERT
BY  ABRAM WILLIAM HOGELAND
Thomas R O'Malley
ATTORNEY

UNITED STATES PATENT OFFICE 2,413,102

DEGASIFIER

David Mathias Ebert, Wilmington, Del., and Abram William Hogeland, Southampton, Pa., assignors to American Viscose Corporation, Wilmington, Del., a corporation of Delaware Application November 25, 1941, Serial No. 420,338

4 Claims. (Cl. 18—54)

This invention relates to the removal of dissolved gases from liquids or solutions, and is more particularly concerned with the removal of dissolved gases from the spinning baths employed in the manufacture of artificial silk from viscose.

Depending upon the particular solutions and the particular gases dissolved therein, any one or more of several reasons may make it desirable to remove, or may even necessitate the removal of, the dissolved gases therefrom. In the case of spinning baths for viscose, the chief gas which it is desirable to remove is hydrogen sulfide, but smaller amounts of other gases, such as sulfur dioxide and carbon disulfide vapors occur along with the hydrogen sulfide and are removed with it. Not only does the hydrogen sulfide give rise to an unpleasant, poisonous and corrosive atmosphere in the spinning rooms as it is slowly liberated from the bath, but it also has an important effect upon the spinning. The presence of excess hydrogen sulfide hinders spinning by inhibiting the regeneration of the cellulose from the xanthate. Apparently, this is caused by the presence of higher thionic acids which are formed by the reaction of sulfur dioxide and hydrogen sulfide which are liberated during the regeneration as a result of the decomposition of cellulose xanthate. By continually removing the hydrogen sulfide, the thionic acids break down and are unable to inhibit the regeneration reaction. Also by removing excess hydrogen sulfide, it is unable to collect around the spinneret holes and cause the weakening or breaking of the filament being spun as would otherwise frequently occur.

Viscose spinning baths contain dissolved gases, chiefly hydrogen sulfide as stated above, products including thionic acids which break down in the presence of oxygen to give hydrogen sulfide, and compounds which can be reduced by hydrogen to give hydrogen sulfide. The hydrogen sulfide available as a result of oxidation amounts to about 8% of the total available hydrogen sulfide whereas the amount developable through reduction amounts to about 6% of the total, these proportions varying depending upon the conditions of spinning and the particular constitution of the spinning bath under consideration. While it is not essential that the small proportion of hydrogen sulfide available as a result of reduction need be removed to prevent apreciable inhibition of the regeneration reaction, it is nevertheless important to remove the greater part of that requiring oxidation for liberation, especially because of the fact that such removal insures the breakdown of the greater proportion, at least, of the thionic acids. It is therefore necessary to obtain intimate mixing of air or other gas containing oxidizing constituents throughout the mass of the solution being treated in order to obtain a rapid and substantially complete oxidation of the compounds yielding hydrogen sulfide thereby.

It is an object of this invention to provide a method for obtaining intimate mixing of a gaseous medium, particularly containing oxidizing constituents, with the solution to be treated. It is a further object of the invention to provide an apparatus for carrying into effect in a preferred manner the method of intimately mixing a gas and a liquid. Further objects of the invention will be apparent from the drawing and the description thereof.

The single figure in the drawing illustrates a preferred form of apparatus for carrying out the invention.

In general, the invention involves the commingling of a gaseous stream, such as of air and a stream of the solution to be de-gassed by forcing them together through one or more constrictions in a conduit opening into a region of reduced pressure, such as into a vessel in which a vacuum is maintained. The forcing of the two streams together, through the constriction or constrictions in the conduit results in a high degree of turbulence and intimate mixing. The gas entrained by the fluid stream almost explosively disrupts the stream as it flows from the constriction as a result of the rapid expansion of the entrained bubles of gas within the stream when the stream reaches the low pressure side of the constriction. This turbulent mixing action may be repeated any number of times by passing through the desired number of constrictions. After flowing from the final constriction, the mixed liquid-gaseous medium is collected within a vessel where under reduced pressure the gas forms bubbles which rise through the mass of liquid, and the gas-free liquid or solution is then returned to the spinning machines. The gas removed by the vacuum pump may be sent to any suitable recovery system to recover the hydrogen sulfide, carbon disulfide, or any other desired constituent. Alternatively, the exhaust gas may be liberated into the atmosphere.

While air has been mentioned as the most practical embodiment of the invention, other gases may be employed, such as nitrogen where oxidation is not particularly desired, waste gases from other industrial operations, such as flue gases, provided such gases do not contain constituents which would undesirably react with the solution being treated, or gases containing hydrogen may be employed where no oxidation is desired and particularly where reduction may be desired. In certain cases, an inert gas, an oxidizing gas, and a reducing gas may be mixed with the solution in succession or simultaneously or any two of these gases may be mixed therewith in succession in any desired order or simultaneously. For example, in the treatment of viscose spinning baths, treatment may be made first with an inert gas, such as nitrogen, then with an oxidizing gas, such as oxygen or air, and then with a gas containing hydrogen, the latter two gases causing respective oxidation and reduction of compounds liberating hydrogen sulfide thereby as stated above. The gases may be removed from other solutions and liquids besides viscose spinning baths and in such cases, any one or more of the types of gases mentioned above may be used either mixed together or in succession. In any particular case, the liberation or removal of gas from the solution or liquid may be entirely physical involving a mere vapor pressure phenomenon, or it may involve chemical reaction to liberate the undesired gaseous constituent from an unstable compound thereof, or the treatment may involve both the physical action and chemical reaction.

A preferred form of apparatus is shown in the drawing, which will be described with respect to its application to the treatment of a viscose spinning bath. The spinning bath coming from the spinning machine flows through the pipe 2 terminating in a distributing manifold composed of four branches 3, 4, 5, and 6, each branch terminating in a nozzle 7 which extends into the upper end of pipe 8 which is provided with a connection 9 for admitting air back of the nozzle opening. More or less than four branches may be employed for the distributing manifold. The pipe 8 and the other three similar pipes extend through the cover plate 10 into the vessel 11. These pipes are provided with constrictions 12 and 13, and they open at 14 into the vessel 11. The vessel 11 is provided with a connection 15 to a vacuum pump which removes the gases and maintains the vacuum within the vessel, and with a connection 16 for withdrawing the treated solution and returning it to the spinning machines. The vessel 11 is divided into two sections by the partitions 17 and 18. These partitions effectively separate the foaming chamber 19 from the chamber 20 within which the liquid is relatively quiescent and they prevent the entrainment of liquids or foam by the vacuum pump through the connection 15. The partition 17 is provided with an aperture 21 near the top of the vessel 11 in order to connect the upper regions of the two chambers. The solution from which most of the gas has separated flows over partition 18 and under partition 17 into the section 20 from which it is withdrawn through the connection 16 and in which any residual gases not liberated in section 19 are removed.

In operation, the pump connected at 15 maintains a vacuum in both sections 19 and 20 of the vessel 11 as a result of the aperture 21 and baffle 17. The air or other gas is introduced through the air pipes 9 and is violently intermixed with the stream of solution flowing through the nozzle 7. As the mixture of gas and liquid approaches the constriction 12, the turbulence increases, and as the mixture flows from the constriction 12, there is a tendency of the gas bubbles to expand as the result of the reduced pressure on the effluent side of the constriction 12 with the result that an almost explosive turbulence is obtained. Similar conditions reoccur at the constriction 13, and when the mixture of gas and liquid emerges from the opening 14 into section 19 of the vessel, the mixture is in a condition of violent foaming. As the mixture proceeds into the upper portions of the section 19 of the vessel 11, the gaseous and liquid phases tend to separate from each other, the air and hydrogen sulfide being removed together through the aperture 21, and the liquid or solution passing over baffle 18 into the relatively quiescent section 20 of the vessel 11.

While two constrictions have been shown along the length of each of pipes 8, a reduced effect may be obtained by employing one such constriction, and increased effects may be obtained by using a greater number of such constrictions. In addition, other arrangements of the several elements of the apparatus may be employed. For example, the pipes 8 need not be arranged vertically, but may be arranged to extend horizontally into the lower portion of vessel 11 so that they open against the baffle 18 instead of against the bottom of the vessel 11. While in the embodiment shown in the figure, the diameter of opening 7 is substantially the same size as the internal diameter of the constrictions 12 and 13, these several diameters may vary considerably from this specific size. Instead of a single vessel partitioned into two chambers, two separate vessels corresponding in operation to chambers 19 and 20 respectively may be provided, connections for delivering the liquid from 19 to 20 and for maintaining a vacuum in both vessels being provided. A considerable proportion of the suspended matter in viscose spinning baths particularly lead xanthate and, to a lesser extent, sulfur, sometimes forms a scum at the surface of the solution in chamber 20, apparently as the result of gas liberation by decomposition of unstable compounds, for example, lead xanthate itself, which gas effects a lowering of the specific gravity of the suspended particles or possibly, though probably to a lesser extent, gives rise to surface tension effects, thereby causing such suspended matter to rise to the surface. The quiescent chamber 20 of vessel 11 may be provided with an outlet at the level of the surface of the liquid through which this scum containing suspended matter may be removed. Alternatively, the suspension may be filtered.

Large variations in the proportions of gas and liquid may be made. Similarly, the degree of vacuum and the rate of flow of the liquid through the vessel 11 are not critical. As a specific example of treating a viscose spinning bath, a vacuum of 15 inches of mercury, a flow of 250 gallons of solution per minute, and a proportion of 0.35 cubic foot of air per gallon of solution treated were found highly satisfactory.

While a preferred embodiment of the invention has been disclosed, the description is intended to be illustrative only, and it is to be understood that changes and variations may be made without departing from the spirit or scope of the invention as defined by the appended claims.

What we claim is:

1. The method of removing dissolved gaseous products including hydrogen sulfide from viscose spinning baths, comprising forcing a stream of an oxidizing gas into a stream of the bath liquid, flowing through a conduit having a narrowing passage, at a point in advance of the passage to cause intimate mixing of, and thereby to facilitate chemical reaction between, oxidizable bath constituents and the gas under gradually increasing pressure and applying a sub-atmospheric pressure to the stream beyond its point of emergence from said conduit.

2. The method of removing dissolved gaseous products including hydrogen sulfide from viscose spinning baths, comprising forcing a stream of an oxidizing gas into a stream of the bath liquid, flowing through a conduit having a narrowing passage and a widening passage substantially immediately beyond the narrowing passage and an outlet disposed within a large body of bath liquid under sub-atmospheric pressure having a turbulent zone adjacent said conduit and a quiescent zone spaced from said conduit, at a point in advance of the narrowing passage to cause intimate mixing of, and thereby to facilitate chemical reaction between, oxidizable bath constituents and the gas under gradually increasing and then decreasing pressure, passing the mixture from the conduit into said large body while allowing excess gas to rise turbulently to the surface of said body of liquid, and continuously passing a subsurface portion of the thus degassed liquid into said quiescent zone.

3. The method of removing dissolved gaseous products including hydrogen sulfide from viscose spinning baths, comprising forcing a stream of an oxidizing gas into a stream of the bath liquid and forcing the mixed stream in succession through a series of narrowing passages spaced along the conduit and through a corresponding number of widening passages, each of the latter being situated substantially immediately beyond a corresponding one of the narrowing passages to cause intimate mixing of, and thereby to facilitate chemical reaction between, oxidizable bath constituents and the gas under alternately increasing and decreasing pressure conditions and applying a sub-atmospheric pressure to the stream beyond its point of emergence from the last of said passages.

4. The method of removing dissolved gaseous products including hydrogen sulfide from viscose spinning baths, comprising forcing a stream of an oxidizing gas into a stream of the bath liquid and forcing the mixed stream in succession through a series of narrowing passages spaced along the conduit and through a corresponding number of widening passages, each of the latter being situated substantially immediately beyond a corresponding one of the narrowing passages, said conduit having an outlet disposed within a large body of bath liquid under sub-atmospheric pressure, said body of liquid having a turbulent zone adjacent said conduit and a quiescent zone spaced from said conduit, to cause intimate mixing of, and thereby to facilitate chemical reaction between, oxidizable bath constituents and the gas under alternately increasing and decreasing pressure conditions, passing the mixture from the conduit into said large body while allowing excess gas to rise turbulently to the surface of said body of liquid, and continuously passing a sub-surface portion of the thus degassed liquid into said quiescent zone.

DAVID MATHIAS EBERT.
ABRAM WILLIAM HOGELAND.